Patented Nov. 7, 1950

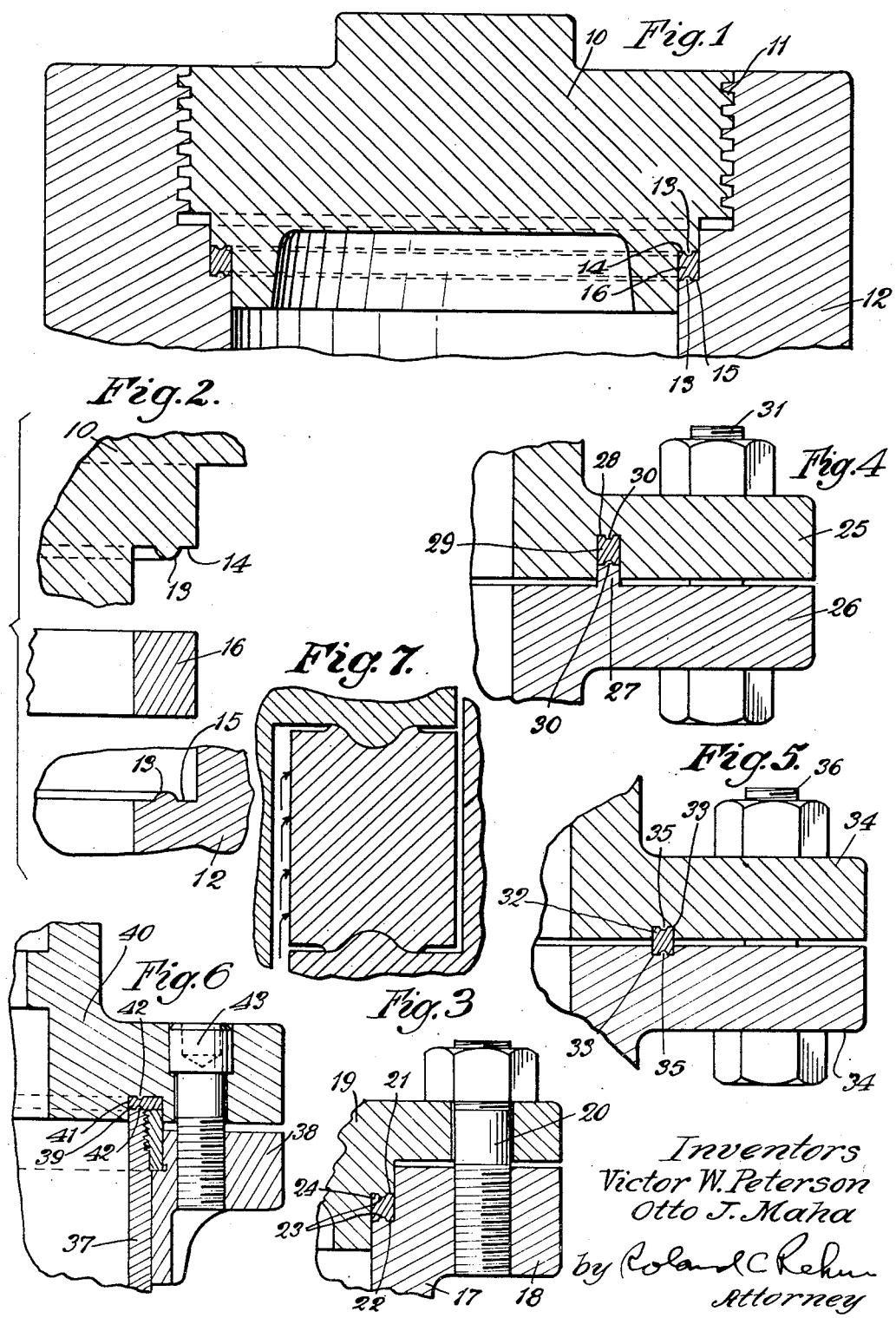

2,528,665

UNITED STATES PATENT OFFICE 2,528,665

GASKET SEAL

Victor W. Peterson and Otto J. Maha, Chicago, Ill., assignors to Hannifin Corporation, a corporation of Illinois Application June 17, 1946, Serial No. 677,302

2 Claims. (Cl. 309—2)

This invention relates to preventing leakage of high pressure fluid in jointed containers, and among other objects aims to provide an improved joint seal for use with metal and similar gaskets.

The nature of the invention may be readily understood by reference to illustrative embodiments thereof shown in the accompanying drawing.

In said drawing:

Fig. 1 is a fragmentary longitudinal section through a cylinder and cylinder head of the type used in ordnance.

Fig. 2 is a fragmentary section on a larger scale of the several elements comprising the seal in the construction of Fig. 1, in separated condition before assembly.

Fig. 3 is a fragmentary section through a conventional cylinder and cylinder head;

Figs. 4 and 5 are fragmentary sections through flanged joints in pipelines and the like;

Fig. 6 is a section similar to that of Fig. 3 illustrating a seal in another type of cylinder and cylinder head; and Fig. 7 is a fragmentary section on a greatly enlarged scale illustrating in exaggerated form the local distortion of the indented gasket and the action of cylinder pressure in improving the seal provided by the gasket.

In sealing cylinder heads and other surfaces against high pressures and temperatures, it is generally necessary to employ a relatively hard and durable gasket material such as metal. It is difficult in such constructions to apply sufficient pressure to the metal gasket of conventional width to provide an efficient seal against high pressures, e. g. of the order of 5000 lbs. per square inch. This is well illustrated by a recoil cylinder head construction for ordnance (illustrated in Fig. 1) wherein the cylinder head 10 is jointed by threads 11 (generally square or modified square) to the cylinder 12. In such construction it is difficult to transmit to the metal gasket sufficient distorting or crushing pressure to effect a seal against the high pressure in the cylinder. The gasket material is not always one of the softer metals such as copper, but (depending on the temperatures involved and the corrosive action of the medium retained) is often monel nickel, iron or various steel compositions. These are even more difficult to compress or distort sufficiently to seal the slight scratches and tool marks inevitably occurring on the metal surfaces, with consequent leakage at high pressures. Even when the head is tightened with bolts, as in Fig. 4, it is not possible to effect an efficient seal. Very narrow gaskets to which a higher pressure could be applied, are obviously impractical.

We have discovered that by forming small continuous beads 13 in the joining surfaces 14 and 15 it is possible to concentrate enough pressure on the intervening metal gasket to indent or distort it sufficiently to provide an efficient seal. The ribs or beads 13 preferably are small in section so as thereby to concentrate enough pressure on the gasket material to seal the minute inequalities in the surfaces of the joint. Under very high fluid pressures, radial pressure against the gasket tends to wedge it even tighter against the bead, thereby further improving the seal. In the present case the bead section may be of the order of $\frac{1}{32}$ of an inch in radius and project above the surfaces 14 and 15 a distance of the order of .020 of an inch. The section of the beads may vary considerably, being determined largely by what is necessary to distort the gasket material. For harder materials than copper the bead may be even smaller than that here shown.

Fig. 2 illustrates on a larger scale the condition and relation of the gasket and beads before assembly.

In Figs. 3 to 6 are illustrated other joints embodying the invention.

In Fig. 3 the invention is embodied in a conventional cylinder and cylinder head construction wherein the cylinder 17 is flanged as at 18 and the cylinder head 19 is connected thereto by stud bolts 20. The gasket bearing surfaces 21 and 22 on the cylinder and cylinder head are each provided with a small integral continuous bead 23 adapted to be imbedded or partly imbedded in the gasket 24 to form a seal.

Figs. 4 and 5 illustrate the application of the invention to couplings in pipe lines and the like. In Fig. 4 the coupling flanges are respectively provided with a centering ring 27 and groove 28 between which the gasket 29 is advantageously interposed, and whose bearing surfaces are provided with the small sealing beads 30. The beads are pressed into the gasket by coupling bolts 31.

The construction shown in Fig. 5 is similar to that of Fig. 4 except that the gasket 32 itself serves as a centering ring, being seated in registering grooves 33 in each of the flanges 34. The sealing beads 35 are formed in the gasket bearing surfaces of each of the grooves and are pressed into the gasket by bolts 36.

Fig. 6 illustrates the application of the invention to a type of cylinder construction shown in Peterson et al. Patent 2,274,458. In such construction the cylinder 37 is formed from cylindrical stock to which is attached separate head flanges 38. The sealing gasket lies between the end of the cylinder itself and the head 40, being in this case seated in a groove 41 in the head. The end of the cylinder and the base of the groove are formed with the sealing beads 42. Sealing pressure is applied by bolts 43 which couple the head to the flange 30.

Obviously the invention is not limited to the details of the illustrative embodiment of the invention shown in the accompanying drawing since these may be variously modified. Moreover it is not indispensable that all features of the invention be used conjointly since various features may be used to advantage in different combinations and sub-combinations.

Having described our invention, we claim:

1. A sealing construction for retaining fluids under high pressures of the order of 5000 pounds per square inch in a cylinder comprising in combination a pair of gasket bearing surfaces, a metal gasket of such hardness as to be capable of resisting extrusion under the maximum fluid pressure in said cylinder, said gasket being at least as hard as annealed copper, and joint coupling means for drawing said surfaces together but said means being incapable alone of exerting sufficient pressures against the gasket and bearing surfaces to prevent leakage along superficial scratches and inequalities in such surfaces, said gasket bearing surfaces each having projecting therefrom in registry with the gasket surfaces a continuous bead integral therewith and of such small cross section as to be capable under the force exerted by said coupling means of indenting said gasket locally sufficiently to seal said scratches and inequalities without substantially spreading said gasket radially, said gasket being exposed to pressure in the cylinder so that said pressure is exerted radially on the gasket to improve the seal of the indented surfaces of said gasket against said beads.

2. A sealing construction for a cylinder head comprising in combination a cylinder and cylinder head each having a gasket bearing surface, means for drawing said surfaces together, a gasket between said surfaces of such hardness that superficial scratches and inequalities in the contacting surfaces could not be sealed by the force exerted by said drawing means, and devices for concentrating the force exerted by said drawing means in such limited areas on the gasket that the gasket is indented thereby to seal said scratches and inequalities, said devices being in the form of a continuous bead integral with and projecting from each of said gasket bearing surfaces and indenting said gasket in substantially a line contact and not substantially distorting said gasket laterally, the gasket being exposed to radial pressure in said cylinder so as thereby to be wedged more tightly against said beads to improve said seal.

VICTOR W. PETERSON.
OTTO J. MAHA.

REFERENCES CITED

The following references are of record in the file of this patent:

UNITED STATES PATENTS

| Number | Name | Date |
|---|---|---|
| 1,825,774 | Boynton | Oct. 6, 1931 |
| 1,884,551 | Boynton | Oct. 25, 1932 |
| 2,070,805 | Peterson | Feb. 16, 1937 |
| 2,352,041 | Van Den Berg | June 20, 1944 |
| 2,360,731 | Smith | Oct. 17, 1944 |